US009971166B2

(12) United States Patent
Lee

(10) Patent No.: US 9,971,166 B2
(45) Date of Patent: May 15, 2018

(54) LIQUID CRYSTAL LENS PANEL AND DISPLAY DEVICE INCLUDING THE SAME

(71) Applicant: SAMSUNG DISPLAY CO., LTD., Yongin, Gyeonggi-do (KR)

(72) Inventor: Jong Suk Lee, Daegu (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 68 days.

(21) Appl. No.: 14/459,948

(22) Filed: Aug. 14, 2014

(65) Prior Publication Data
US 2015/0192781 A1    Jul. 9, 2015

(30) Foreign Application Priority Data

Jan. 3, 2014   (KR) .................. 10-2014-0000747

(51) Int. Cl.
*G02B 27/22* (2006.01)
*G02F 1/29* (2006.01)
*G02F 1/1337* (2006.01)

(52) U.S. Cl.
CPC ........... *G02B 27/2214* (2013.01); *G02F 1/29* (2013.01); *G02F 1/133753* (2013.01);
(Continued)

(58) Field of Classification Search
CPC .. G02F 1/29; G02F 2001/294; G02B 27/2214
See application file for complete search history.

(56) References Cited

U.S. PATENT DOCUMENTS

2011/0032438 A1*  2/2011  Yun .................... G02F 1/13471
                                                              349/15
2011/0228181 A1*  9/2011  Jeong .................. G02B 5/1842
                                                              349/15
(Continued)

FOREIGN PATENT DOCUMENTS

JP       2009-271322      11/2009
KR   10-2010-0018479       2/2010
(Continued)

OTHER PUBLICATIONS

Pochi Yeh, Optics of Liquid Crystal Display, Septempber 16, 1999, p. 122, Wiley, Hoboken, N.J.

*Primary Examiner* — Dung Nguyen
(74) *Attorney, Agent, or Firm* — F. Chau & Associates, LLC.

(57) ABSTRACT

A liquid crystal lens panel includes a lower lens electrodes divided into lower lens electrode groups; an upper lens electrode positioned opposite to the lower lens electrodes; alignment layers positioned on the lower lens electrodes and the upper lens electrode, respectively; and a liquid crystal layer interposed between the lens electrodes that includes liquid crystal molecules. The liquid crystal layer forms a liquid crystal lens upon application of an electric field by the upper lens electrode and the lower lens electrode groups, and each of the lens electrode groups corresponds to a unit of the liquid crystal lens. The alignment layer is divided into a first region and a second region positioned about a center of the liquid crystal lens, and the liquid crystal molecules included in the first region and the second region are aligned at different angles whose signs are opposite to each other.

5 Claims, 14 Drawing Sheets

(A)

(B)

(C)

(52) U.S. Cl.
CPC .. *G02F 1/133784* (2013.01); *G02F 1/133788* (2013.01); *G02F 2001/133749* (2013.01)

(56) References Cited

U.S. PATENT DOCUMENTS

| | | |
|---|---|---|
| 2011/0292306 A1 | 12/2011 | Kim et al. |
| 2012/0257127 A1 | 10/2012 | Miyazawa et al. |
| 2012/0300141 A1 | 11/2012 | Shin et al. |
| 2012/0307169 A1 | 12/2012 | Ohyama et al. |
| 2012/0314143 A1 | 12/2012 | Shin et al. |
| 2013/0107174 A1 | 5/2013 | Yun et al. |
| 2013/0135545 A1* | 5/2013 | Jung .................. G02F 1/13306 349/33 |
| 2013/0169909 A1 | 7/2013 | Srivastava et al. |
| 2014/0111715 A1 | 4/2014 | Jeong et al. |

FOREIGN PATENT DOCUMENTS

| | | |
|---|---|---|
| KR | 10-2011-0104701 | 9/2011 |
| KR | 10-2013-0028759 | 3/2013 |

\* cited by examiner (A)

(B)

(C)

LIQUID CRYSTAL LENS PANEL AND DISPLAY DEVICE INCLUDING THE SAME

CROSS-REFERENCE TO RELATED APPLICATION

This application claims priority under 35 U.S.C. § 119 from Korean Patent Application No. 10-2014-0000747 filed in the Korean Intellectual Property Office on Jan. 3, 2014, and all the benefits accruing therefrom, the contents of which are herein incorporated by reference in their entirety.

BACKGROUND (a) Technical Field

Embodiments of the present disclosure are directed to a liquid crystal lens panel and a display device including the same.

(b) Discussion of Related Art

In general, a display device displays a 2D planar image. Recently, as the demand for 3D stereoscopic images for games and movies has increased, display devices can now display 3D stereoscopic images.

A stereoscopic image display device divides and displays a left-eye image and a right-eye image that have binocular disparity to a left eye and a right eye of a viewer. The viewer views the left-eye image and the right-eye image through both eyes and recognizes a 3D effect by combining the images in the brain.

A linear polarization type stereoscopic display device uses stereoscopic glasses to divide the left-eye image and the right-eye image to make a stereoscopic image, but is inconvenient due to the need for the viewer to wear the glasses.

To address this inconvenience, recently, stereoscopic display device that do not require wearing glasses have been proposed. These types of displays include a lenticular type, a parallax type, an integral photography type, a holography type, etc., according to the device that separates the image for each eye, and recently, attention has focused on a lenticular type stereoscopic image display device.

As a lens for the lenticular type, a convex lens and a Fresnel lens may be used. A Fresnel lens is thinner than a convex lens. A Fresnel lens has a plurality of circular arcs on the surface. A Fresnel lens refracts light on the circular arcs.

Recently, liquid crystal devices which implement lenses by controlling the director distribution of a liquid crystal by an electric field have been manufactured. A liquid crystal lens includes an upper panel, a lower panel, and a thick liquid crystal layer between the upper panel and the lower panel. A liquid crystal lens includes a plurality of electrodes which control the director distribution of the liquid crystal by the application of different voltages to respective electrodes.

In this case, to provide the liquid crystal layer of the liquid crystal lens with a predetermined pretilt, alignment layers are provided on the upper panel and the lower panel of the liquid crystal lens that have a predetermined alignment angle.

SUMMARY

Embodiments of the present disclosure can provide a liquid crystal lens panel and a display device incorporating the same that have reduced asymmetry between left and right prisms of a liquid crystal lens and that can maximize diffraction efficiency of the prisms by aligning left and right areas of the liquid crystal lens to have opposite alignment angles to minimize crosstalk when a stereoscopic image is displayed.

An exemplary embodiment of the present disclosure provides a liquid crystal lens panel, that includes: a lower substrate; a plurality of lower lens electrodes positioned on the lower substrate that are divided into a plurality of lower lens electrode groups; an upper substrate positioned opposite the lower substrate; an upper lens electrode positioned below the upper substrate; alignment layers positioned on the lower lens electrode and the upper lens electrode, respectively; and a liquid crystal layer interposed between the upper substrate and the lower substrate that includes a plurality of liquid crystal molecules, in which the liquid crystal layer forms a liquid crystal lens upon application of an electric field by the upper lens electrode and the lower lens electrode groups, and each of the plurality of lower lens electrode groups corresponds to a unit of the liquid crystal lens, the alignment layer is divided into a first region and a second region positioned about a center of the liquid crystal lens, the liquid crystal molecules included in the first region and the second region are aligned at different angles, and signs of an alignment angle of the liquid crystal molecules included in the first region of the alignment layer and an alignment angle of the liquid crystal molecules included in the second region may be opposite to each other.

A difference between magnitudes of the alignment angles of the first and second regions may be 0° to 2°.

Magnitudes of the alignment angles of the first and second regions may be the same as each other.

The magnitude of the alignment angle may be from about 2° to 10°.

The alignment angles of the liquid crystal molecules in the first region and the second region of the alignment layer may be opposite to a direction of an electric field applied to each region.

The liquid crystal molecules included in the alignment layer positioned on a lens electrode corresponding to a center unit of the liquid crystal lens may not be aligned at a predetermined angle.

The alignment layer may be formed by alternatively exposing the first region and the second region of the liquid crystal lens using a mask.

An area of an in-plane region of the first region and an area of an in-plane region of the second region of the liquid crystal lens may be minimized by a balance of the alignment of the liquid crystal molecules in the first region and the second region and the direction of the electric field applied to each region.

A difference between diffraction efficiency of the first region of the liquid crystal lens and diffraction efficiency of the second region may be less than 10%.

The liquid crystal lens panel may further include a display panel configured to display an image, upon which the liquid crystal lens panel is disposed, that is selected from a group comprising a liquid crystal display panel, an electrophoretic display panel, an organic light-emitting display panel, and a plasma display panel.

Another exemplary embodiment of the present disclosure provides a liquid crystal lens panel that includes: a lower substrate; a plurality of lower lens electrodes positioned on the lower substrate that are divided into a plurality of lower lens electrode groups; an upper substrate positioned opposite the lower substrate; an upper lens electrode positioned below the upper substrate; alignment layers positioned on the lower lens electrode and the upper lens electrode, respectively; and a liquid crystal layer interposed between the upper substrate and the lower substrate that includes a plurality of liquid crystal molecules, in which the liquid crystal layer forms a liquid crystal lens divided into a plurality of regions upon application of an electric field by the upper lens electrode and the lower lens electrode groups, the lower lens electrode group corresponds to the plurality of regions of the liquid crystal lens, and the alignment layer has different average liquid crystal molecule alignment directions for each of the plurality of regions of the liquid crystal lens, and alignment directions of liquid crystal molecules in left side regions of the liquid crystal lens are opposite to alignment directions of liquid crystal molecules in right side regions of the liquid crystal lens.

The alignment angle in each region is determined by calculating a pretilt alignment angle that maximizes a diffraction efficiency of each region based on the number and widths of the electrodes that configure each region of the liquid crystal lens.

The alignment layer may be formed by sequentially exposing each respective region using a plurality of masks, wherein each mask of the plurality of masks has a same pattern as each individual region of the plurality of regions.

The alignment layer may be formed by being sequentially exposing regions thereof by sequentially shifting a single mask having one pattern.

The liquid crystal lens panel may further include a display panel configured to display an image, upon which the liquid crystal lens panel is disposed, that is selected from a group comprising a liquid crystal display panel, an electrophoretic display panel, an organic light-emitting display panel, and a plasma display panel.

Yet another exemplary embodiment of the present disclosure provides a liquid crystal lens panel that includes a lower substrate; a plurality of lower lens electrodes positioned on the lower substrate that are divided into a plurality of lower lens electrode groups; an upper substrate positioned opposite the lower substrate; an upper lens electrode positioned below the upper substrate; alignment layers positioned on the lower lens electrode and the upper lens electrode, respectively; and a liquid crystal layer interposed between the upper substrate and the lower substrate that includes a plurality of liquid crystal molecules. The alignment layer is divided into a center region, and first region and a second region positioned about the center region, the liquid crystal molecules included in the first region and the second region are aligned at different angles, signs of an alignment angle of the liquid crystal molecules included in the first region and an alignment angle of the liquid crystal molecules included in the second region are opposite to each other, and the liquid crystal molecules included in the center region are not aligned at a predetermined angle.

The liquid crystal layer may form a liquid crystal lens upon application of an electric field by the upper lens electrode and the lower lens electrode groups, and each of the plurality of lower lens electrode groups may correspond to a unit of the liquid crystal lens. The alignment angles of the liquid crystal molecules in the first region and the second region of the alignment layer are opposite to a direction of the electric field applied to each region.

An area of an in-plane region of the first region and an area of an in-plane region of the second region of the liquid crystal lens may be minimized by a balance of the alignment of the liquid crystal molecules in the first region and the second region and the direction of the electric field applied to each region.

Magnitudes of the alignment angles of the first and second regions may be from about 0° to 2°, and a magnitude of the alignment angle may be from about 2° to about 10°.

The liquid crystal lens panel may further include a display panel upon which the liquid crystal lens panel is disposed, said the display panel configured to display an image, and may be selected from a group comprising a liquid crystal display panel, an electrophoretic display panel, an organic light-emitting display panel, and a plasma display panel.

DETAILED DESCRIPTION OF EXEMPLARY EMBODIMENTS

Figure 1:
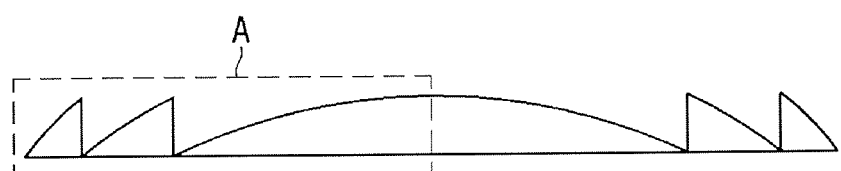
FIGS. 1A, B, C illustrates a principle and a cross section of a liquid crystal lens according to an exemplary embodiment of the present disclosure.
Figure 1:
Figure 1:
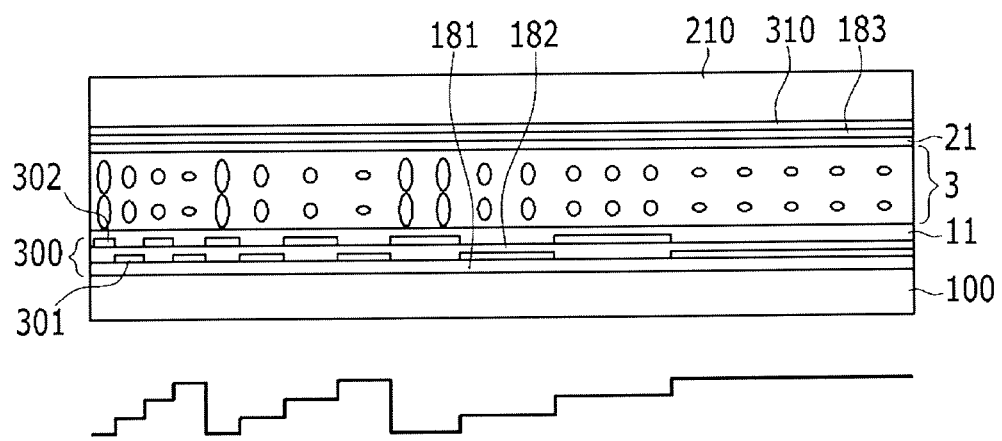

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Hereinafter, a liquid crystal lens and a display device incorporating the same according to an exemplary embodiment of the present disclosure will be described in detail with reference to the accompanying drawings.

First, a liquid crystal lens according to an exemplary embodiment of the present disclosure will be described with reference to FIGS. 1 to 4.

FIG. 1 illustrates a principle and a cross section of a liquid crystal lens according to an exemplary embodiment of the present disclosure. FIG. 1A illustrates a structure of a general Fresnel lens, and FIG. 1B illustrates an enlarged view of a portion represented by a dotted line in FIG. 1A. A step-shaped straight line illustrated in FIG. 1B illustrates a zone plate phase distribution. FIG. 1C illustrates a liquid crystal lens according to an exemplary embodiment of the present disclosure.

As illustrated in FIG. 1C, the liquid crystal lens of the present disclosure includes a lower substrate 100, an upper substrate 210 facing the lower substrate, and a liquid crystal layer 3 interposed between the lower substrate and the upper substrate.

A first insulating layer 181, a plurality of first lens electrodes 301, a second insulating layer 182, and a plurality of second lens electrodes 302 are disposed on the lower substrate. The plurality of first lens electrodes 301 and the plurality of second lens electrodes 302 comprise a lower lens electrode 300. Since the second insulating layer 182 is disposed between the first lens electrodes 301 and the second lens electrodes 302, the first electrodes and the second electrodes are disposed on different layers and electrically insulated from each other.

The first lens electrodes 301 and the second lens electrodes 302 may include a transparent conductive oxide. For example, the first lens electrodes 301 and the second lens electrodes 302 may include indium tin oxide (ITO), indium zinc oxide (IZO), etc.

The first insulating layer 181 and the second insulating layer 182 may include an insulating material that transmits light. For example, the first insulating layer 181 and the second insulating layer 182 may include silicon nitride (SiNx), silicon oxide (SiOx), etc. The first insulating layer 181 is disposed on the lower substrate, the first lens electrodes 301 are disposed on the first insulating layer 181, the second insulating layer 182 is disposed on the first insulating layer 181 and the first lens electrodes 301, and the second lens electrodes 302 are disposed on the second insulating layer 182.

An upper lens electrode 310 is disposed on the upper substrate 210. The upper lens electrode 310 may include a transparent conductive oxide material. For example, the upper lens electrode 310 may include indium tin oxide (ITO), indium zinc oxide (IZO), etc. The upper lens electrode 310, together with the first lens electrodes 301 and the second lens electrodes 302, rearranges liquid crystal molecules of the liquid crystal layer. An upper insulating layer 183 is disposed on the upper lens electrode 310, and may include an insulating material that transmits light.

The liquid crystal layer 3 may have a thickness of about 2 μm to 5 μm. Since the liquid crystal layer 3 is thin, a high-speed alignment conversion of the liquid crystal molecules is possible. The first lens electrodes 301, the second lens electrodes 302, and the upper lens electrode 310 may align the liquid crystal layer 3 to behave as a Fresnel lens.

A lower alignment layer 11 is disposed on the second lens electrode 302 of the lower substrate. Similarly, an upper alignment layer 21 is disposed on the upper insulating layer of the upper substrate.

The lower alignment layer 11 and the upper alignment layer 21 determine the initial alignment of the liquid crystal molecules of the liquid crystal layer 3 and the pre-determined alignment directions of the liquid crystal molecules may be rapidly re-aligned by the electric field generated in the liquid crystal layer 3.

The lower alignment layer 11 and the upper alignment layer 21 may be rubbed in a direction to form a predetermined angle.

In an embodiment of the present disclosure, each of the lower alignment layer 11 and the upper alignment layer 21 of the liquid crystal lens is divided into a first region and a second region positioned about a center of the liquid crystal lens, and the two regions are aligned at different angles.

In the first region, a pretilt direction of the liquid crystal molecule is opposite to a direction of a repulsive force of the electric field, and in the second region, the pretilt direction of the liquid crystal molecule coincides with the direction of the repulsive force of the electric field.

Hereinafter, as illustrated in FIGS. 2A-C and FIG. 3, the first region is referred to as a left region, and the second region is referred to as a right region. The left region is positioned on a left side of the liquid crystal lens when viewing the drawing, and the right region is positioned on a right side of the liquid crystal lens when viewing the drawing. The correspondence of the left and right regions of the first region and the second region is arbitrary, and may be modified in other exemplary embodiments.

Hereinafter, the lower alignment layer 11 and the upper alignment layer 21 are integrally referred to as an alignment layer. That is, in the following description, the alignment layer includes both the lower alignment layer and the upper alignment layer.

Figure 2A:
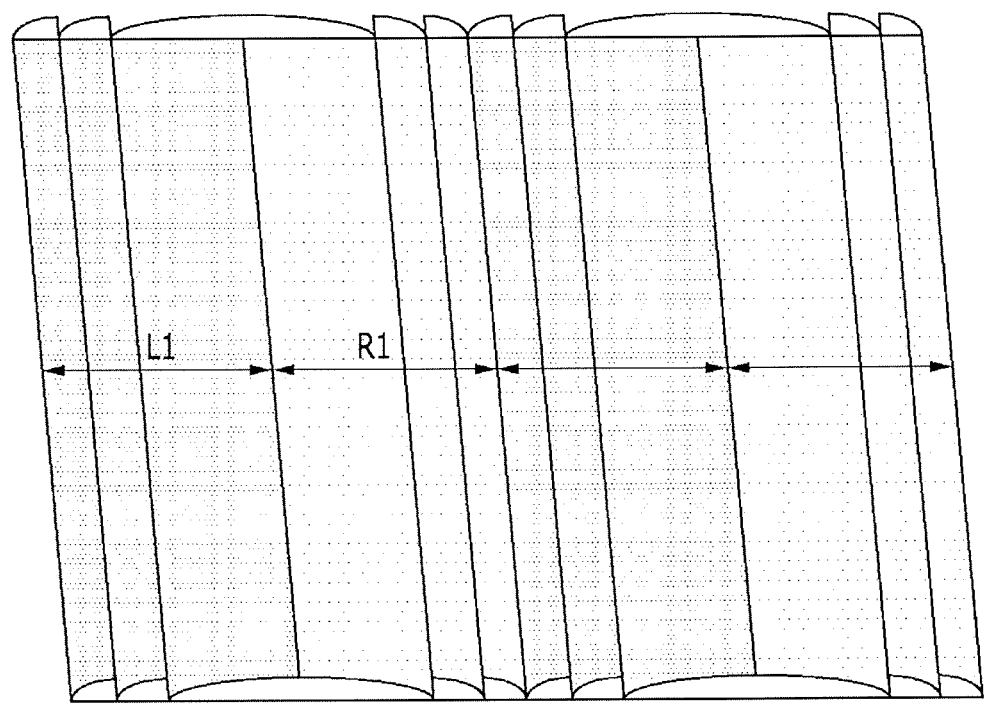
FIG. 2A illustrates an alignment layer of a liquid crystal lens according to an exemplary embodiment of the present disclosure.

FIG. 2A illustrates an alignment layer of a liquid crystal lens according to an exemplary embodiment of the present disclosure. Referring back to FIG. 1B, a liquid crystal lens is formed from a plurality of unit lenses in which the same zone plate phase distribution is repeated. That is, the same zone plate phase distribution is repeated to configure one unit lens.

Referring to FIG. 2A, alignment angles of the liquid crystal molecules in the left and right regions of the alignment layer of one liquid crystal lens according to the exemplary embodiment of the present disclosure are different from each other. In this case, as shown in FIG. 2B, a plus (+) sign is used when the angle rotates right with respect to a reference line of the angle, and a minus (−) sign is used when the angle rotates left with respect to the reference line of the angle.

Figure 2B:
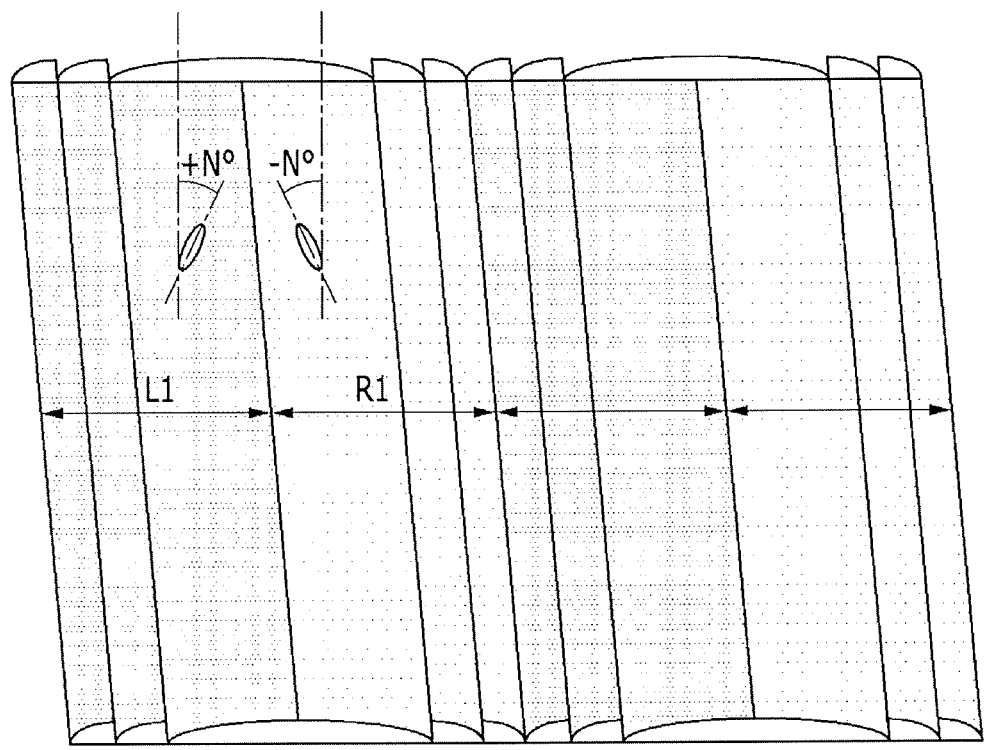
FIG. 2B illustrates an alignment layer of a liquid crystal lens and a pretilt of a liquid crystal according to an exemplary embodiment of the present disclosure.

FIG. 2B illustrates an alignment layer of a liquid crystal lens and a pretilt of the liquid crystal according to an exemplary embodiment of the present disclosure. Referring to FIG. 2B, pretilts of the liquid crystal formed by the alignment layer in the left region and the alignment layer in the right region have the same magnitude, but different signs.

In an exemplary embodiment of FIG. 2B, a reference direction of the pretilt angle is a direction parallel to one side of the liquid crystal lens panel. However, according to an exemplary embodiment, the pretilt may be determined by an extending direction of the liquid crystal lens. Further, in FIG.

2B, the liquid crystal molecules in the left liquid crystal lens are aligned to the right with respect to the reference direction, and the liquid crystal molecules in the right liquid crystal lens are aligned to the left with respect to the reference direction. As a result, the liquid crystal molecules are aligned so that heads of the liquid crystal molecules turn toward the center of the liquid crystal lens. However, according to other exemplary embodiments, the liquid crystal molecules in the right liquid crystal lens may be aligned to the right with respect to the reference direction, and the liquid crystal molecules in the left liquid crystal lens may be aligned to the left with respect to the reference direction.

In an exemplary embodiment of the present disclosure, pretilt angles of the alignment layer in a left region L1 and a right region R1 are symmetric with respect to the center of a liquid crystal lens. That is, the pretilt angles of the liquid crystal molecules formed by alignment angles in the left region and the right region of the alignment layer have the same magnitude, but opposite signs.

In an exemplary embodiment of the present disclosure, the pretilt alignment angles of the liquid crystal molecules may be from 2° to 10°, and may be from 3° to 7°. However, the magnitudes of the alignment angles in the two regions are the same. That is, when the alignment angle in the left region of the liquid crystal lens is 5°, the alignment angle in the right region is −5°. On the other hand, when the alignment angle in the right region is −5°, the alignment angle in the left region is 5°.

Figure 2C:
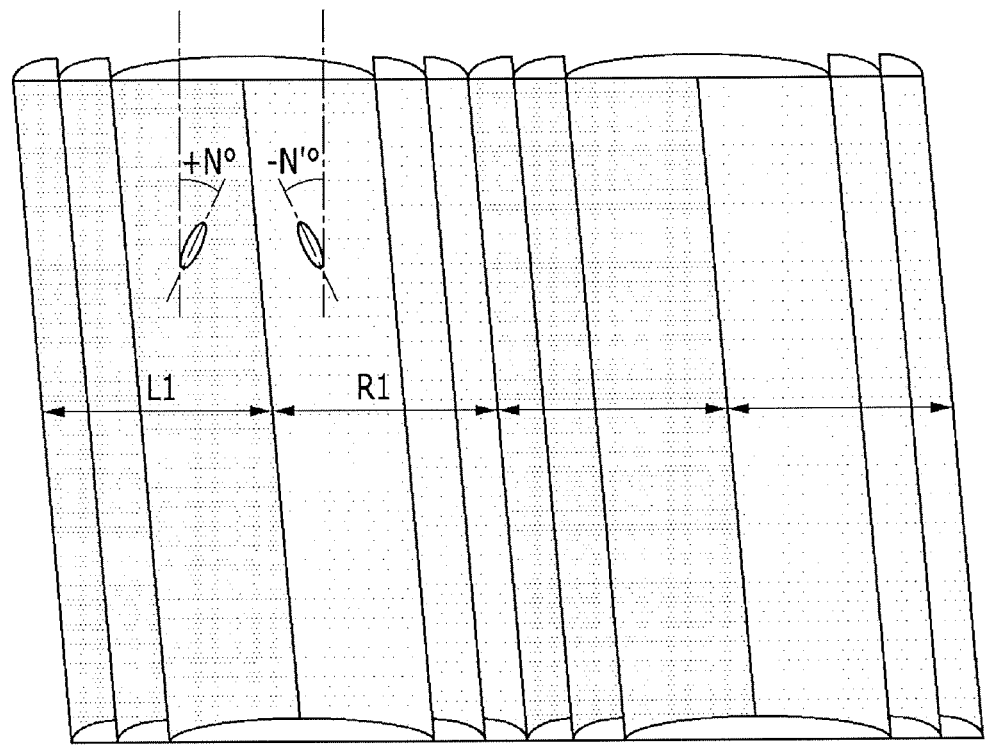
FIG. 2C illustrates an alignment layer of the liquid crystal lens and a pretilt of a liquid crystal according to an exemplary embodiment of the present disclosure.

FIG. 2C illustrates an alignment layer of a liquid crystal lens and the pretilt of the liquid crystals according to an exemplary embodiment of the present disclosure. Referring to FIG. 2C, the pretilts of the liquid crystal molecules due to the alignment layer in the left region and the alignment layer in the right region have opposite signs, and may have a magnitude difference of about 0° to 2°.

That is, the signs of the pretilts of the alignment layers of the liquid crystal in the first region and the second region are opposite to each other, but the magnitudes thereof may differ. According to an exemplary embodiment, the magnitude in the first region may be greater than the magnitude in the second region, or the magnitude in the second region may be greater than the magnitude in the first region. A magnitude difference may be about 0° to 2°.

This situation occurs when the liquid crystal lens electrode is not vertical, but has a predetermined slope, in which case optimal alignment angles in the first region and the second region may vary due to the slope of the lens electrode.

Figure 3:
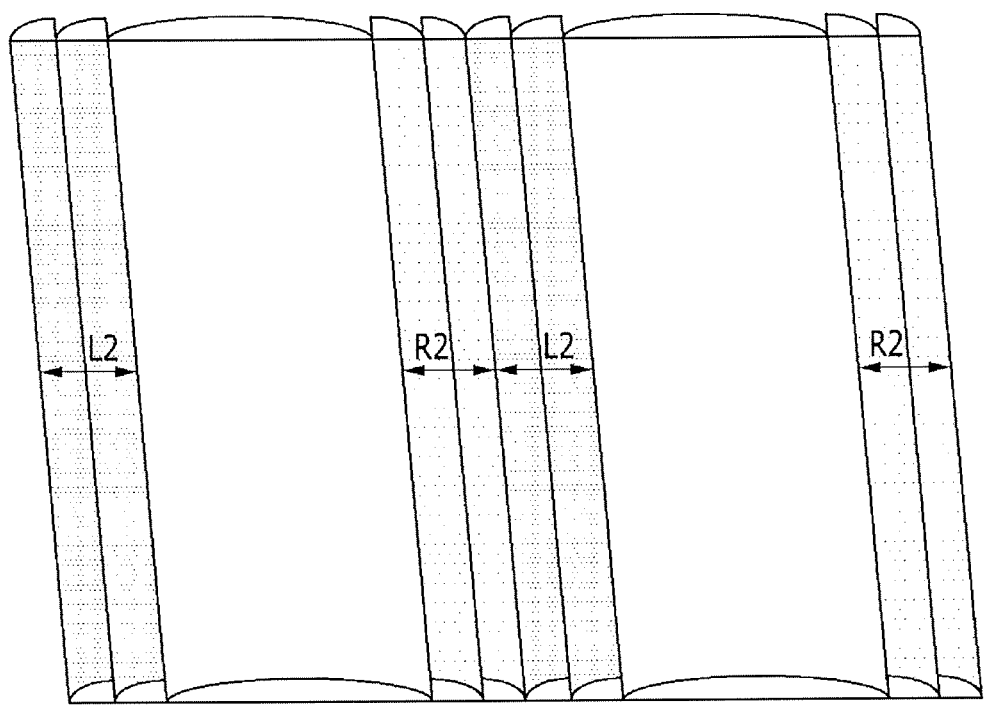
FIG. 3 illustrates an alignment layer of a liquid crystal lens according to another exemplary embodiment of the present disclosure.

In an exemplary embodiment of the present disclosure, an alignment layer on a central unit lens that is centrally positioned among respective unit lenses of the liquid crystal lens may not be aligned at any angle. FIG. 3 illustrates an alignment layer of a liquid crystal lens according to another exemplary embodiment of the present disclosure. Referring to FIG. 3, an alignment layer facing a central unit lens that is centrally positioned in a liquid crystal lens does not have a predetermined alignment angle. That is, the liquid crystal on the central unit lens does not have a pretilt angle.

As illustrated in FIG. 3, the alignment layer of the central unit lens is not aligned at a predetermined pretilt angle. Accordingly, only a left region L2 and a right region R2 of the liquid crystal lens are aligned at angles with opposite signs and the same magnitude.

The pretilt alignment angles may be from about 2° to about 10°, and may be from about 3° to about 7°. However, the magnitudes of the alignment angles in the two regions are the same. That is, if the alignment angle in the left region with respect to the center of the liquid crystal lens is 5°, the alignment angle in the right region is −5°. On the other hand, if the alignment angle in the right region is −5°, the alignment angle in the left region is 5°.

Alternatively, the left region L2 and the right region R2 of the liquid crystal lens may be aligned at angles with opposite signs but magnitudes that differ by about 0° to 2°. That is, for example, if the alignment angle of the liquid crystal molecules in the left region is 5°, the alignment angle of the liquid crystal molecules in the right region may be −7°.

A method of forming a predetermined alignment angle of an alignment layer includes techniques that use rubbing, photo-alignment techniques that use an inclined ion beam or ultraviolet light (UV), voltage applying techniques, etc., based on properties of the alignment material.

For example, a method of determining the alignment of the liquid crystal molecules by rubbing includes coating a polyimide layer on the substrate, pre-baking the polyimide layer, heating and removing a solvent in the polyimide layer, baking the polyimide layer, forming an alignment layer of a polymer material by acetylation, and then moving the substrate with the alignment layer aligned in an opposite direction to a rotating direction of a rayon roller.

Accordingly, when forming the alignment angle by rubbing, to form different alignment angles of the alignment layers in the left and right regions of one liquid crystal lens, a rotating direction of the roller or the moving direction of the substrate in the left and right regions may vary.

However, the photo-alignment method, the voltage applying method, or a combination method thereof may be used instead of the rubbing method based on properties of the alignment layer.

For example, an alignment direction of an organic-inorganic polysiloxane alignment layer in which pretilt functional groups are coupled may be formed by irradiation from an inclined UV or ion beam. As another example, molecules in the alignment layer may be realigned by obliquely irradiating UV on an alignment layer of low-molecular azopigment derivatives. The realigned molecules are stabilized by heating the alignment layer, and the liquid crystal molecules are aligned in a predetermined direction.

As such, when forming the alignment angle using photo-alignment, the alignment angles of the left and right regions may vary by alternately irradiating light using a mask that divides the left and right regions one of a liquid crystal lens.

Figure 4:
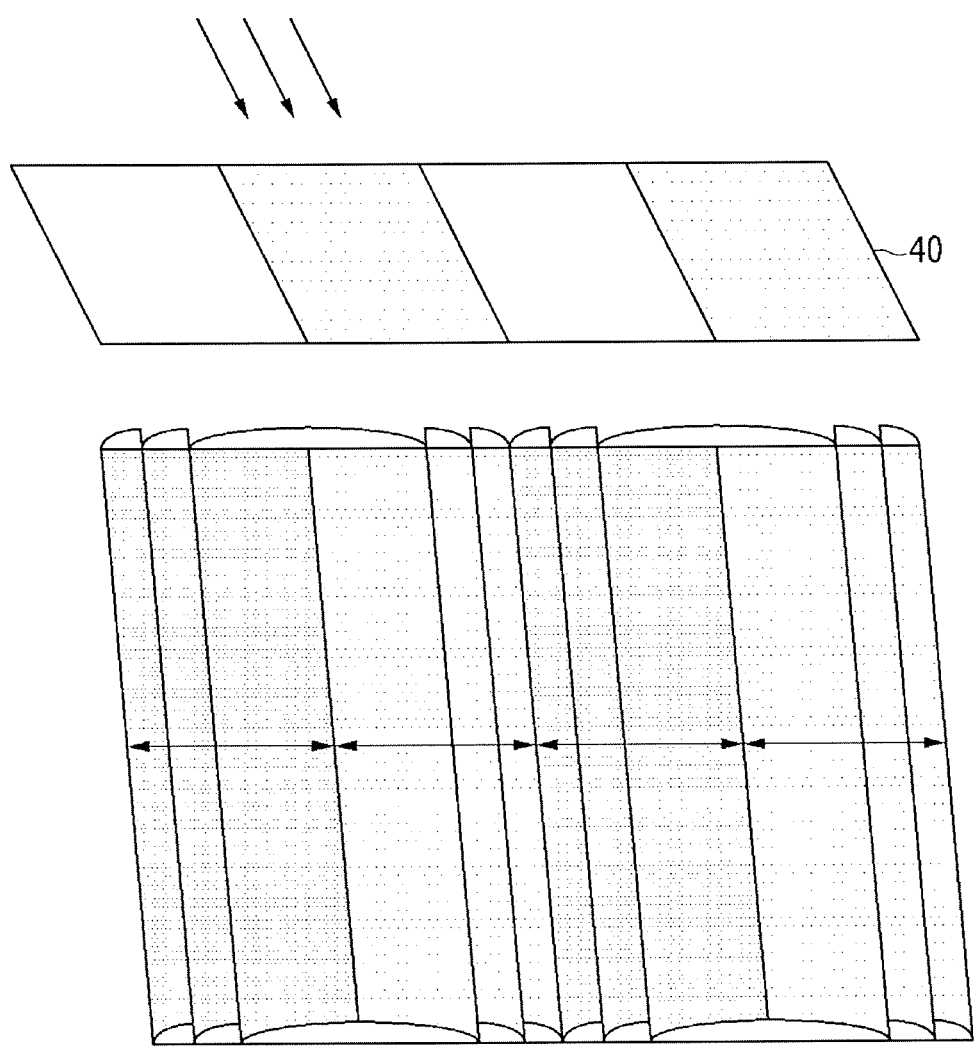
FIG. 4 illustrates a method of forming an alignment angle of an alignment layer of a liquid crystal lens according to an exemplary embodiment of the present disclosure.

FIG. 4 illustrates a method of forming an alignment angle of an alignment layer of a liquid crystal lens according to an exemplary embodiment of the present disclosure. Referring to FIG. 4, light is selectively irradiated to left and right regions of a liquid crystal lens using a mask 40 that has a pattern that divides the left and the right regions of the liquid crystal lens. Alignment angles of the left region and the right region of the liquid crystal lens may be differently formed by partially irradiating light to the liquid crystal lens using the mask 40.

As such, in a liquid crystal lens of the present disclosure, alignment angles in the left and right regions of a liquid crystal lens are opposite to each other. Opposite alignment angles in the left and right regions may resolve an imbalance between left and right frames of the liquid crystal lens and maximize diffraction in the left and right frames. As diffraction efficiency is maximized, crosstalk between viewpoints may be minimized when a stereoscopic image is displayed using a liquid crystal lens.

Next, an effect of a liquid crystal lens of the present disclosure will be described with reference to FIGS. 5, 6, and 10.

Figure 5:
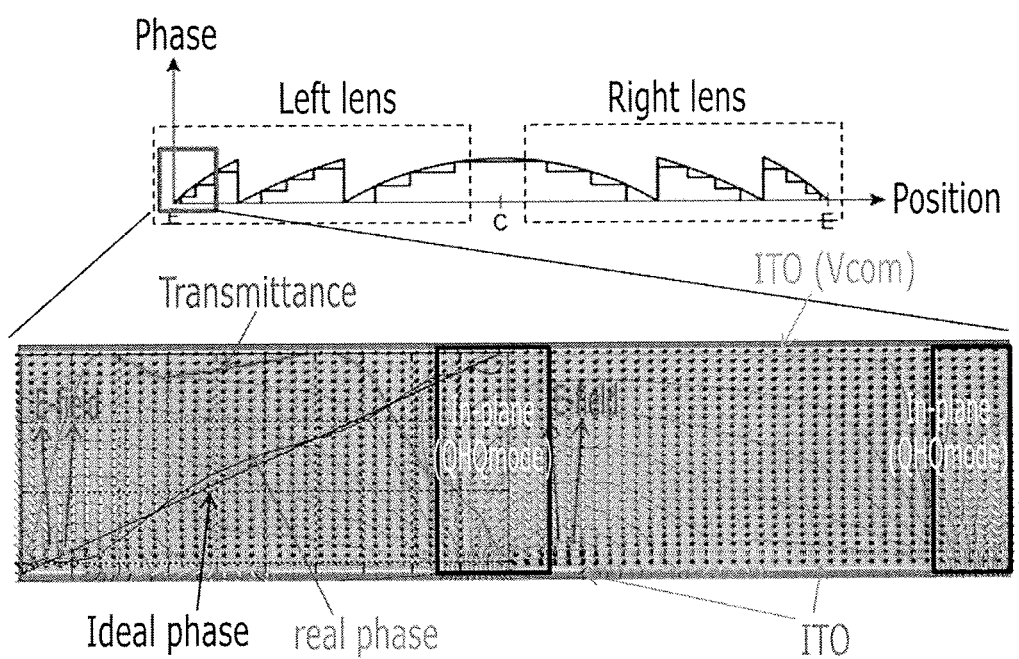
FIG. 5 illustrates a voltage, transmittance, and a liquid crystal in a left lens region of a liquid crystal lens according to a Comparative Example of the present disclosure.

FIG. 5 illustrates a voltage, transmittance, and a liquid crystal in a left lens region of a liquid crystal lens according to a comparative example of the present disclosure. FIG. 6 illustrates a voltage, transmittance, and a liquid crystal in a right lens region of a liquid crystal lens according to the comparative example of the present disclosure.

Referring to FIG. 5, a liquid crystal lens is configured by a plurality of individual unit lenses, and a plurality of frames are formed by the individual unit lenses. A lower left of FIG. 5 illustrates an electric field, transmittance, the liquid crystal alignment, and the real and ideal phases in the individual frames that configuring one unit lens.

Referring to FIG. 5, an electric field (E-field) is formed by voltages applied to a plurality of individual lens electrodes and upper common electrodes disposed on the lower and upper substrates. The electric field rotates the liquid crystal in a desired direction, and the rotated liquid crystal serves as a prism by refracting light.

FIG. 5 shows a graph of an ideal phase for a Fresnel lens, and a real phase formed by an actually applied voltage. As illustrated in FIG. 5, the ideal phase and the real phase do not coincide with each other, and in particular, have a largest difference at an in-plane region at an edge of a frame.

The in-plane region, which is a region between adjacent frame zones, is a boundary where the liquid crystal lens phases change stepwise, as illustrated in FIG. 5. That is, a boundary region in which the liquid crystal lens phases change is the in-plane region. In the in-plane region, since the difference between the ideal phase and the real phase is greatest and the liquid crystal is not aligned in a desired direction, the diffraction efficiency of the liquid crystal lens is reduced. In addition, as an area of the in-plane region increases, a region in which the light is not diffracted in a desired direction increases, which reduces diffraction efficiency.

In the in-plane region, a force of the liquid crystal molecules due to the pre-applied pretilt and a pushing force due to the electric field are balanced, and the liquid crystal forms a stable state.

In general, the alignment layer of the liquid crystal lens is aligned so that the liquid crystal molecules have pretilts from about 3° to 5°. Accordingly, in the left (first) region of the liquid crystal lens, the pretilt direction of the liquid crystal molecules and the pushing force direction of the electric field are opposite to each other. Accordingly, the stable state is formed by the balance between the two forces.

However, in the right (second) region of the liquid crystal lens, the pretilt direction of the liquid crystal molecules and the pushing force direction of the electric field are the same. This is because the pretilt directions of the liquid crystal molecules in a liquid crystal lens are the same, while the pushing force direction of the electric field are opposite to each other on the left and the right of the liquid crystal lens.

Figure 6:
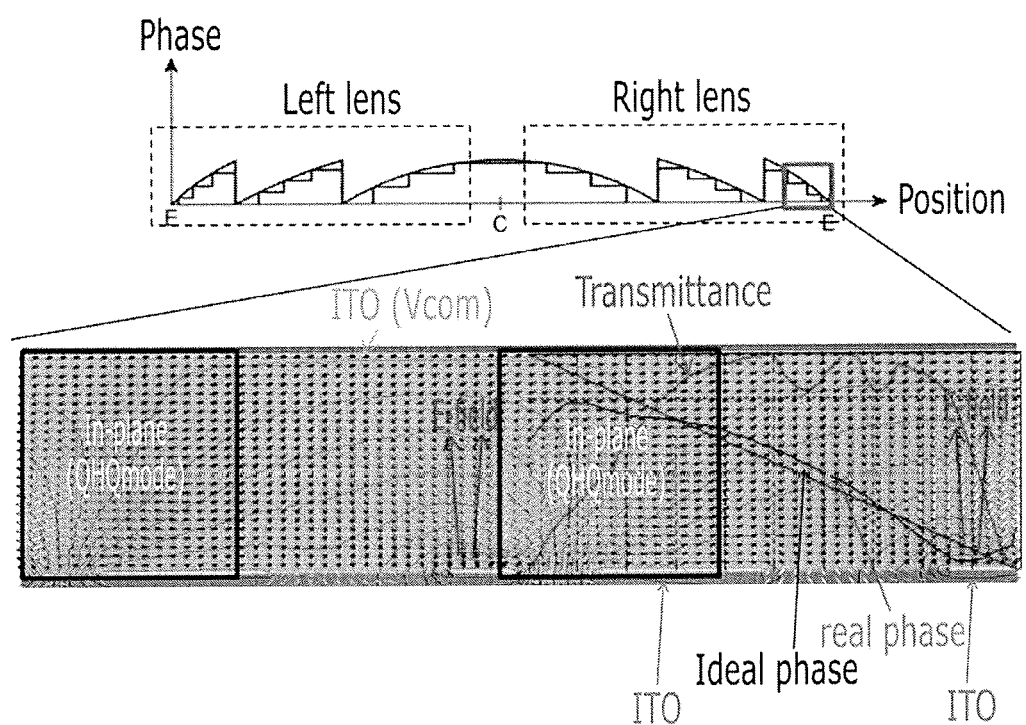
FIG. 6 illustrates a voltage, transmittance, and a liquid crystal in a right lens region of a liquid crystal lens according to a Comparative Example of the present disclosure.

FIG. 6 illustrates a voltage, transmittance, and a liquid crystal in a right lens region of the liquid crystal lens according to the comparative example of the present disclosure. As described above, an area of the in-plane region is larger than an area of the left lens region, and a difference between the ideal phase and the real phase is also large.

The reason is that the force applied to the liquid crystal molecules is not balanced and the liquid crystal does not form the stable state because the pretilt direction of the liquid crystal molecule in the right lens region and the electric field direction are the same.

Accordingly, since the in-plane area in the right lens region is large, the diffraction efficiency in the right lens region is reduced as compared with the left lens region, and an imbalance between left and right prisms is caused.

However, in a liquid crystal lens of the present disclosure, the pretilts of the liquid crystal molecules are opposite to each other by controlling the alignment angles in the left and right regions of a liquid crystal lens to resolve the imbalance between the left and right prisms.

That is, the pretilt directions in the left and right regions of the liquid crystal lens according to an exemplary embodiment of the present disclosure are opposite to each other. Accordingly, in the left region of the liquid crystal lens, since the pretilt direction of the liquid crystal molecules and the pushing direction by the electric field are opposite to each other, the liquid crystal molecules form a stable state, thereby minimizing the in-plane region. Further, in the right region of the liquid crystal lens, the liquid crystal molecules are pretilted in an opposite direction to the pretilt direction in the left region, and the pretilt direction of the liquid crystal molecules and the pushing force by the electric field are balanced to minimize the in-plane region. Accordingly, the left and right in-plane regions of the liquid crystal lens have similar areas, which secures a balance between the left and right prisms, and simultaneously, minimizes the in-plane area to increase the diffraction efficiency of the liquid crystal lens.

Figure 10A:
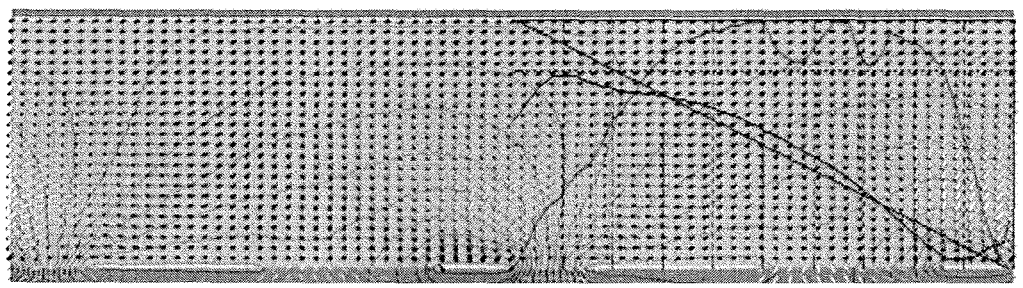
FIG. 10A illustrates a voltage, transmittance, and a liquid crystal in a right lens region according to a Comparative Example of the present disclosure.
Figure 10B:
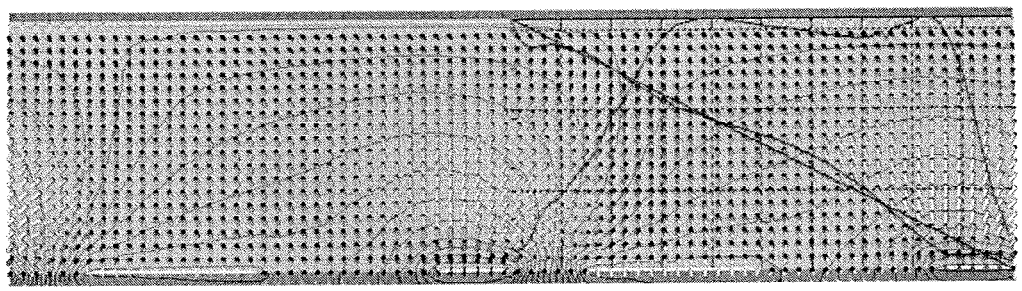
FIG. 10B illustrates a voltage, transmittance, and a liquid crystal in a right lens region according to an Example of the present disclosure.

FIG. 10A illustrates a voltage, transmittance, and a liquid crystal in a right lens region according to a comparative example of the present disclosure. FIG. 10B illustrates a voltage, transmittance, and a liquid crystal in a right lens region according to an example of the present disclosure.

Referring to FIG. 10a, in a comparative example in which all the alignment layers of the liquid crystal lens are aligned in one direction and the liquid crystal molecules have the same pretilt, a difference between an ideal phase and a real phase is large.

However, referring to FIG. 10B, in a liquid crystal lens according to an example of the present disclosure in which the left and right alignment layers of the liquid crystal lens are aligned in opposite directions, the difference between the ideal phase and the real phase is significantly reduced. Accordingly, the in-plane region may be minimized, which improves the diffraction efficiency in the right lens region, thereby maximizing the diffraction efficiency of the entire liquid crystal lens.

According to an experimental example of the diffraction efficiency of a liquid crystal lens according to the present disclosure, as compared with a case in which the left and right regions of the liquid crystal lens have the same pretilt alignment angle, like an example of the present disclosure, asymmetry and diffraction efficiency are improved when the left and right regions of the liquid crystal lens are aligned to have opposite pretilt angles.

In detail, according to a comparative example of the present disclosure, when all the left and right regions of the liquid crystal lens are aligned with a pretilt angle of 5°, the diffraction efficiency of the left lens region is 90.8%, but the diffraction efficiency in the right lens region is 75.6%. Accordingly, there is an asymmetry of 15.2%.

However, like an exemplary embodiment of the present disclosure, when the left lens region is aligned with a pretilt angle of 5° and the right lens region is aligned with a pretilt angle of −5°, the diffraction efficiency of the left lens region is 90.8%, which is the same as that of the comparative example, but the diffraction efficiency in the right lens region is 89.5%, which is improved. Accordingly, it can be seen that the asymmetry of the two prisms is 1.2% which is significantly reduced as compared with 15.2% of the Comparative Example.

Next, a liquid crystal lens according to another exemplary embodiment of the present disclosure will be described with reference to FIGS. 7 to 9.

Figure 7:
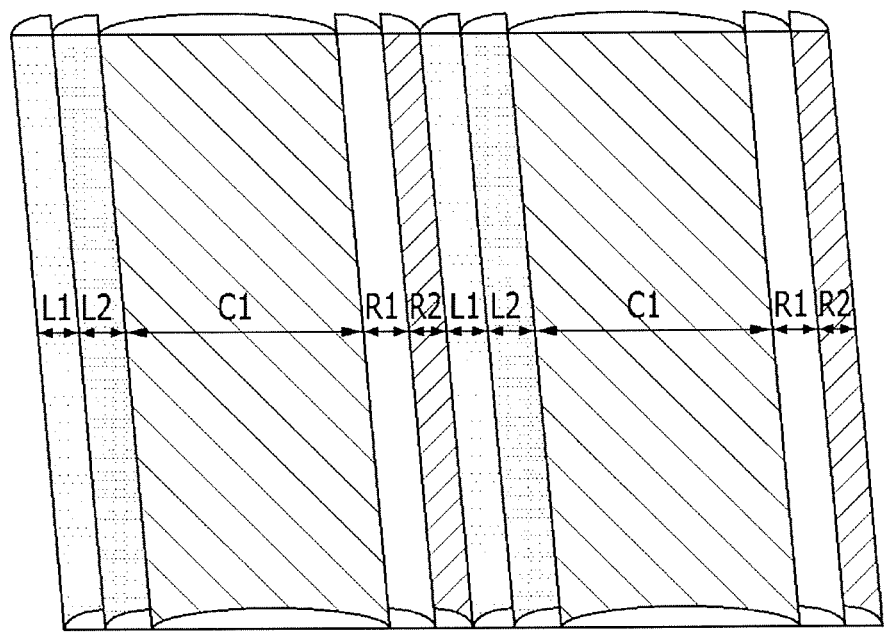
FIG. 7 illustrates an alignment layer of a liquid crystal lens according to another exemplary embodiment of the present disclosure.

FIG. 7 illustrates an alignment layer of a liquid crystal lens according to another exemplary embodiment of the present disclosure. FIG. 8 illustrates a method of manufacturing an alignment layer of a liquid crystal lens according to another exemplary embodiment of the present disclosure, and FIG. 9 illustrates another method of manufacturing an alignment layer of a liquid crystal lens according to another exemplary embodiment of the present disclosure.

Referring to FIG. 7, in a liquid crystal lens according to an exemplary embodiment of the present disclosure, the regions of the alignment layer that face the individual unit lens are aligned at different angles, respectively. That is, in FIG. 7, alignment angles of regions L1, L2, C1, R1, and R2 are different from each other.

The alignment angle in each region may be determined by calculating a pretilt angle that maximizes a diffraction efficiency of each region based on the number and widths of the electrodes that configure each individual unit lens. The alignment angles may differ from each other in each individual region, but the alignment angles in the left regions of the lens, that is, L1, L2, L3, . . . regions, have opposite signs to those in the right regions of the lens, that is, R1, R2, R3, . . . regions. However, magnitudes of the alignment angles in the symmetric left and right regions do not need to be the same. The alignment angles are calculated by considering the electrode number and the electrode width of the individual unit lens, and the voltage magnitudes may differ from each other in the symmetric left and right lenses.

That is, in an exemplary embodiment, average alignment directions of liquid crystal molecules for the plurality of regions of one liquid crystal lens differ from each other. The term "average liquid crystal molecule alignment direction" as used in the present disclosure means an average of the alignment directions of the liquid crystal molecules included in each region. That is, the average of the alignment directions of the liquid crystal molecules aligned in one region is referred to as an average liquid crystal molecule alignment direction, and in the present disclosure, is used together with an expression called the alignment angle.

A method of forming a predetermined alignment angle of the alignment layer is the same as described above. That is, the method may use a rubbing technique, a photo-alignment technique that uses an inclined ion beam or ultraviolet (UV) light, a voltage applying technique, etc., based on properties of an alignment material. A detailed description for like constituent elements is omitted.

Figure 8:
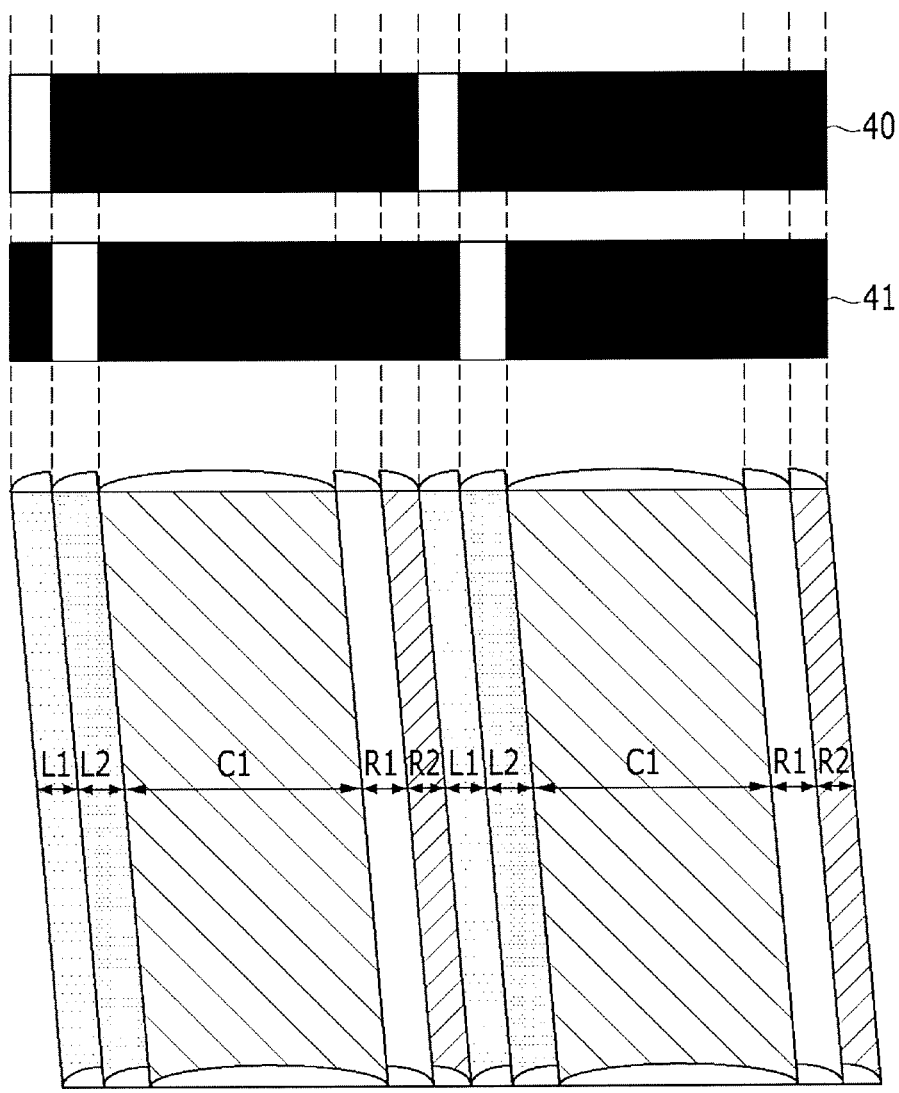
FIG. 8 illustrates a method of manufacturing an alignment layer of a liquid crystal lens according to an exemplary embodiment of the present disclosure.

FIG. 8 illustrates a method of photo-aligning an alignment layer at different angles for each region using masks 40 and 41 that have a pattern corresponding to each individual lens region.

Referring to FIG. 8, there exist a plurality of masks that have patterns with different angles corresponding to the individual regions. That is, the first mask 40 corresponds to the region L1 of the liquid crystal lens, and the second mask 41 corresponds to the region L2 of the liquid crystal lens. Accordingly, the number of the masks is the same as the number of the individual unit electrodes of the liquid crystal lens. The alignment layer may be aligned at different alignment angles for each region by repeating a process of positioning and exposing a mask corresponding to one region.

Figure 9:
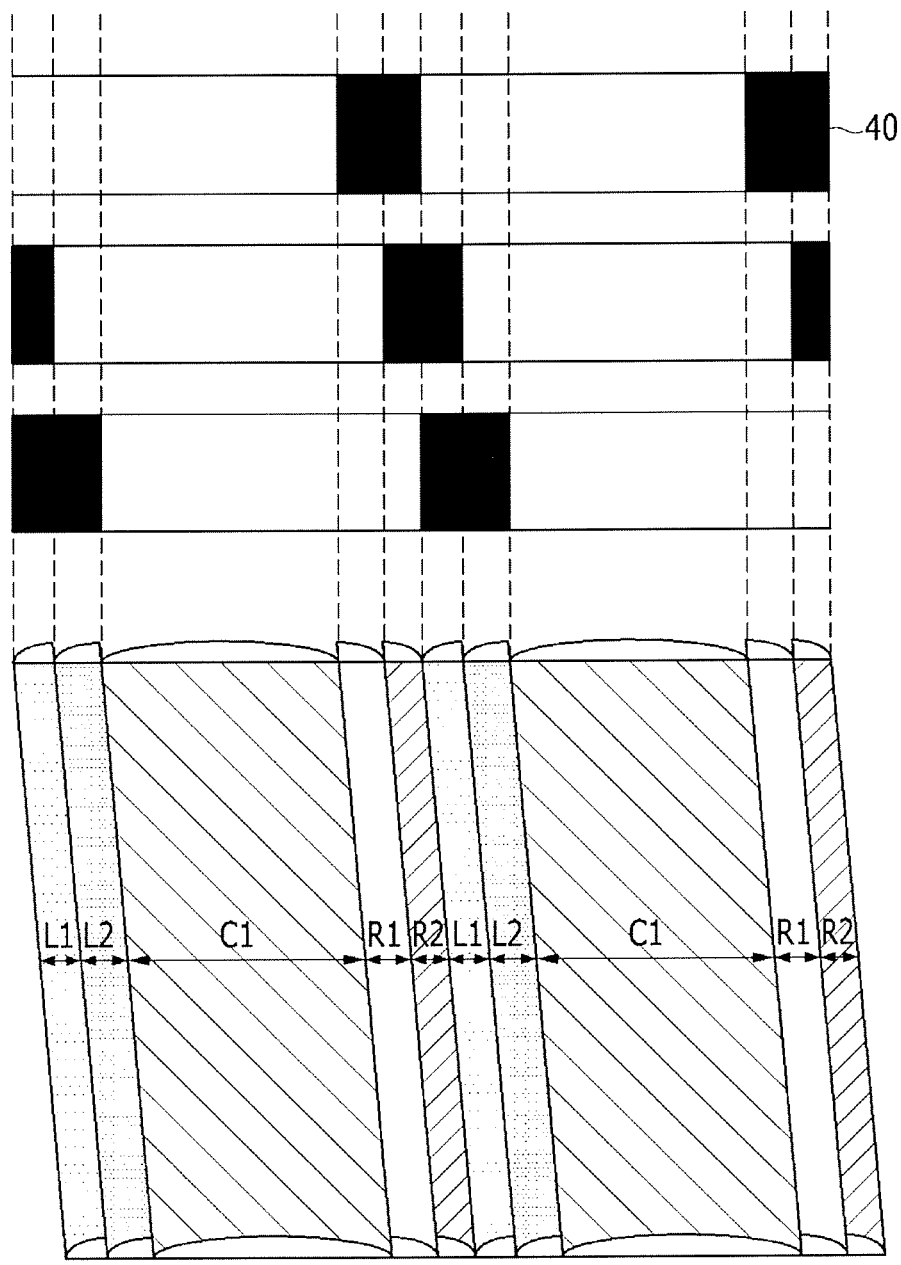
FIG. 9 illustrates a method of manufacturing an alignment layer of a liquid crystal lens according to another exemplary embodiment of the present disclosure.

FIG. 9 illustrates a method of photo-aligning an alignment layer at different angles for each region while moving a mask 40 that has one pattern.

Referring to FIG. 9, the mask 40 has the same pattern repeated at a predetermined interval, and is positioned on the liquid crystal lens alignment layer. The regions L1, L2, and C1 are exposed when the mask is positioned at a first position.

Thereafter, the position of the mask is shifted, and the regions L2, C1, and R1 are exposed. As such, as the regions are sequentially exposed as the position of the mask is shifted, an exposure amount may be properly controlled for each region. A sum of the energy of the exposed light varies according to a position of each mask for each region, and as a result, an alignment angle of each region may be controlled. As such, the alignment angle of each region may be controlled through accumulative exposure at different positions by using one mask.

Figure 11:
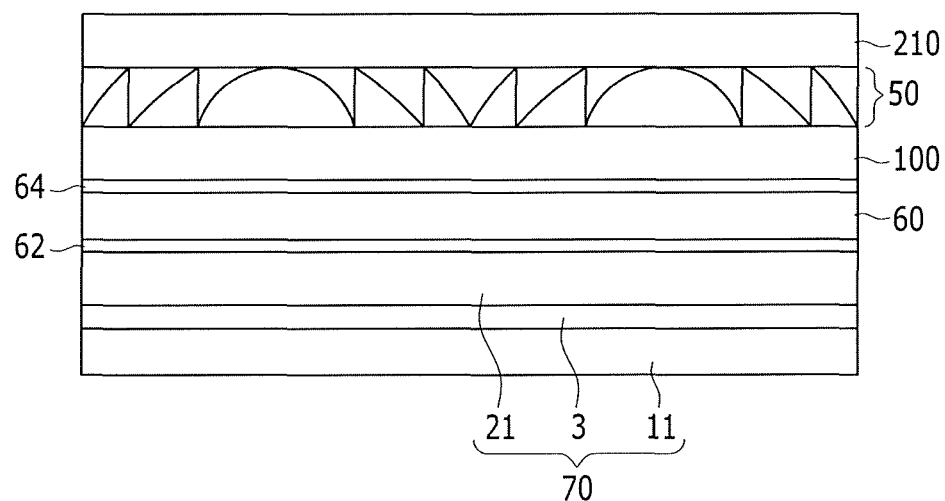
FIG. 11 illustrates a display device which incorporates a liquid crystal lens according to an exemplary embodiment of the present disclosure.

Next, a display device which may incorporate a liquid crystal lens of the present disclosure will be described with reference to FIG. 11. FIG. 11 illustrates a display device that incorporates a liquid crystal lens of the present disclosure. The display device of FIG. 11 includes a display panel 70, and a liquid crystal lens 50 positioned on the display panel. The display panel 70 may be one of any of various display panels, such as a liquid crystal display panel (LCD panel), an electrophoretic display panel (EDP), an organic light-emitting display panel (OLED panel), and a plasma display panel (PDP). In an exemplary embodiment, the display panel 70 may be a liquid crystal display (LCD) panel.

The display panel includes a first substrate 11 and a second substrate 21 facing each other, and a liquid crystal layer 3 positioned between the substrates. The liquid crystal molecules of the liquid crystal layer 3 align themselves according to a potential applied to the electrodes formed on the first substrate and the second substrate to display an image.

The first substrate includes a plurality of pixel areas. In each pixel area, a gate line extending in a first direction, a data line extending in a second direction crossing the first direction and insulatively crossing the gate line, and a pixel electrode are included. Further, in each pixel area, a thin film transistor electrically connected to the gate line and the data line and electrically connected to the corresponding pixel electrode is provided. The thin film transistor supplies a driving signal to the corresponding pixel electrode. Further, a driver IC may be included at one side of the first substrate. The driver IC receives various external signals, and outputs a driving signal to the thin film transistor that drives the display panel 70 in response to various received control signals.

The second substrate may include an RGB color filter that imparts a predetermined color to light received from a backlight unit on one side, and a common electrode formed on the RGB color filter that faces the pixel electrode. Here, the RGB color filter may be formed through a thin film process. In addition, in the present disclosure, forming the color filter on the second substrate is described as an example, but the color filter is not limited thereto. For example, the color filter may be formed on the first substrate. Further, the common electrode of the second substrate may be formed on the first substrate.

The liquid crystal layer 3 is aligned in a predetermined direction by a voltage applied to the pixel electrode and the common electrode to control transmittance of light received from the backlight unit, and as a result, the display panel 70 may display an image. When there is no backlight unit, transmittance of light input and reflected to the entire display panel is controlled to display an image.

The liquid crystal lens is positioned on the display panel, and includes a lower substrate 100 on the display panel and an upper substrate 210 opposite the lower substrate. The configuration of the liquid crystal lens is as described above, and thus a detailed description for like constituent elements is omitted. In a liquid crystal lens according to an exemplary embodiment of the present disclosure, nine pixels may configure two liquid crystal lenses. That is, 4.5 pixel electrodes may be positioned below one liquid crystal lens. This means that a horizontal length of the liquid crystal lens is the same as the sum of horizontal lengths of the 4.5 pixels. In a structure in which red, green, and blue pixels are sequentially disposed, if three red, green, and blue pixels are defined as one pixel unit, two liquid crystal lenses may correspond to a unit of three pixels.

The liquid crystal lens is spaced apart from the display panel 70 to ensure a proper focal distance of the lens. Accordingly, a gap spacing layer is positioned between the liquid crystal lens 50 and the display panel 70.

The gap spacing layer may be a gap spacing plate 60 made of transparent glass or plastic.

A lower surface of the gap spacing plate 60 adheres to the display panel 70 by an optical adhesive 62, and an upper surface thereof adheres to the lower surface of the liquid crystal lens 50 by an optical adhesive 64. The optical adhesives 62 and 64 are made of optically transparent materials so that refractive indexes of the optical adhesives 62 and 64 are not substantially different from refractive indexes of the display panel 70, the gap spacing plate 60, and the liquid crystal lens 50.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal lens panel, comprising:
   a first substrate;
   a plurality of first lens electrodes positioned on the first substrate that are divided into two first lens electrode groups disposed on different layers and electrically insulated from each other;
   a second substrate positioned opposite the first substrate;
   a second lens electrode positioned below the second substrate;
   alignment layers positioned on the first lens electrode and the second lens electrode, respectively; and
   a liquid crystal layer interposed between the second substrate and the first substrate that includes a plurality of liquid crystal molecules, wherein the liquid crystal layer forms a liquid crystal lens divided into a plurality of regions upon application of an electric field by the second lens electrode and the first lens electrode groups,
   wherein each electrode of the plurality of first lens electrodes corresponds to one of the plurality of regions of the liquid crystal lens, and
   the alignment layer includes liquid crystal molecules having different average liquid crystal molecule alignment directions for each of the plurality of regions of the liquid crystal lens, and alignment directions of liquid crystal molecules in left side regions of the liquid crystal lens are opposite to alignment directions of liquid crystal molecules in right side regions of the liquid crystal lens.

2. The liquid crystal lens panel of claim 1, wherein:
   the alignment angle in each region is determined by calculating a pretilt alignment angle that maximizes a diffraction efficiency of each region based on the number and widths of the electrodes that configure each region of the liquid crystal lens.

3. The liquid crystal lens panel of claim 1, wherein:
   the alignment layer is formed by sequentially exposing each respective region using a plurality of masks, wherein each mask of the plurality of masks has a same pattern as each individual region of the plurality of regions.

4. The liquid crystal lens panel of claim 1, wherein:
   the alignment layer is formed by sequentially exposing regions thereof by sequentially shifting a single mask having one pattern.

5. The liquid crystal lens panel of claim 1, further comprising:
   a display panel upon which said liquid crystal lens panel is disposed, said display panel configured to display an image,
   wherein the display panel is one selected from a group comprising a liquid crystal display panel, an electrophoretic display panel, an organic light-emitting display panel, and a plasma display panel.

\* \* \* \* \*